May 17, 1949. M. H. ALLDREDGE 2,470,205
SOCKET ASSEMBLY
Filed April 20, 1944 2 Sheets-Sheet 1
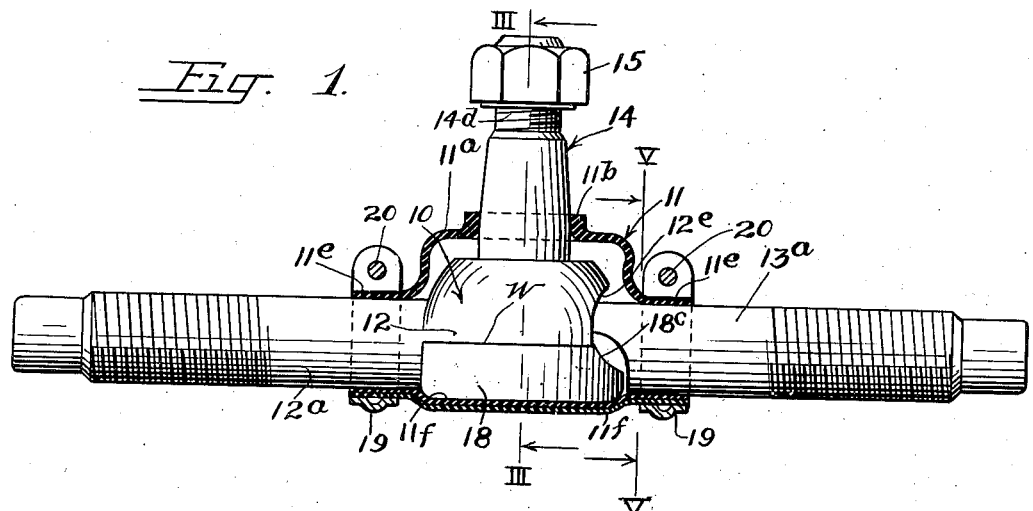
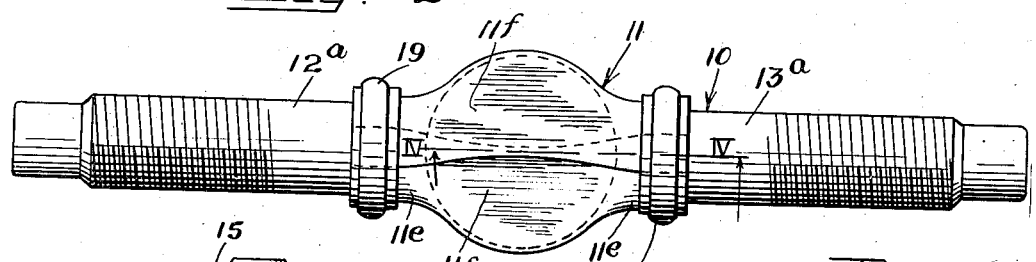
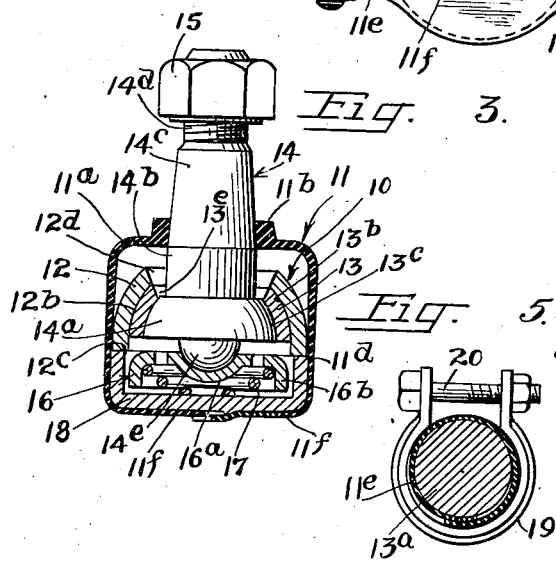
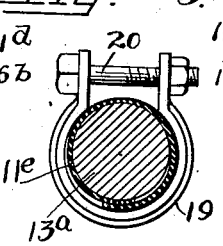
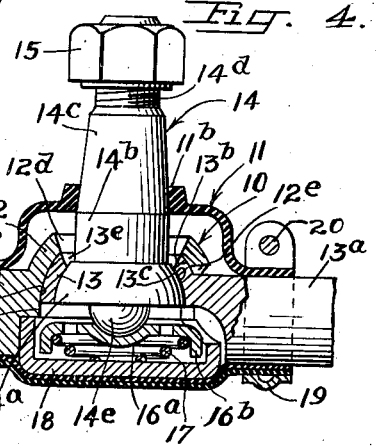
Inventor
Marshall Homer Alldredge.

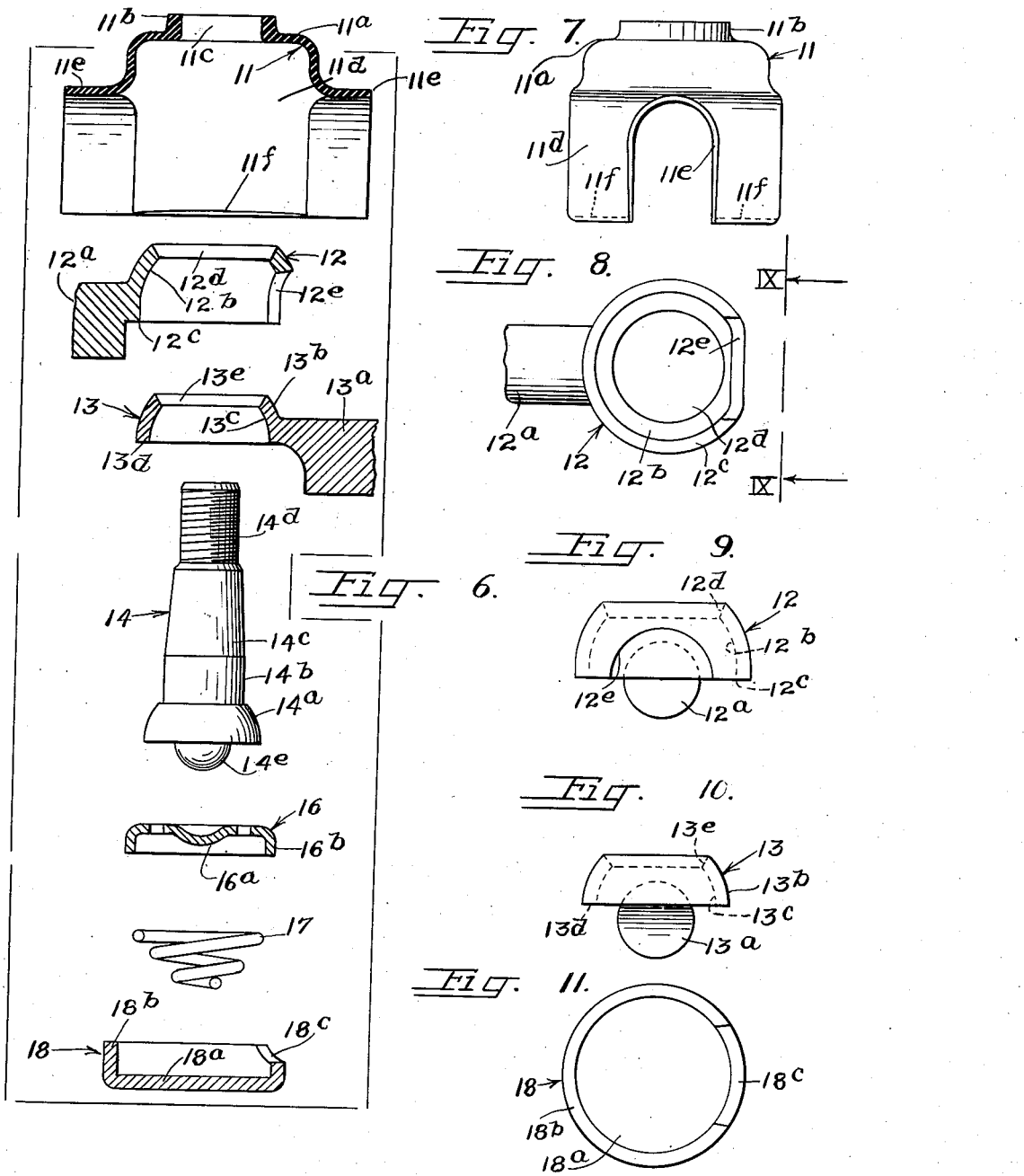

Patented May 17, 1949

2,470,205

UNITED STATES PATENT OFFICE 2,470,205

SOCKET ASSEMBLY

Marshall Homer Alldredge, Detroit, Mich., assignor to Thompson Products, Inc., a corporation of Ohio Application April 20, 1944, Serial No. 531,885

8 Claims. (Cl. 287—90)

This invention relates to multiple joint assemblies, and particularly to double socket tie rod joints.

According to this invention a first tie rod end socket receives a second tie rod end socket in nested tiltable and rotatable relation. A stud has a head tiltable and rotatable in the second socket and a shank projecting freely through apertures in both sockets. A closure member or plug is secured to the first socket to form a bottom for the assembly, and a spring-urged retainer bottomed on the closure plug acts on the stud to urge the stud into good bearing relationship with the second socket and to urge the second socket into good bearing relationship with the first socket. The entire assembly can be covered by a rubber boot having apertures for snugly embracing the stems of the sockets and the shank of the stud.

The multiple tie rod joint assembly is useful in automotive steering mechanism with the stud shank secured in the eye end of a steering arm and the stem of the first and second socket members secured to separate tie rods.

While the invention is specifically described as embodied in a tie rod end or joint assembly, it should be understood that the multiple joint units of this invention are useful in other types of mechanical linkages to provide for limited universal action of three or more members.

It is, then, an object of this invention to provide a joint assembly composed of nested socket members and a stud member with all of the members being rotatable and tiltable relative to each other.

A further object of the invention is to provide a multiple socket tie rod end joint.

A still further object of the invention is to provide a universal joint assembly wherein nested socket members are tiltable and rotatable relative to each other and form housings for a stud member which is tiltable and rotatable relative to the socket member.

A still further object of the invention is to provide a joint assembly composed of a first stemmed ring member having an internal wall accommodating rotating and tilting movements, a second stemmed ring member having an outer wall tiltable and rotatable on the inner wall of the first member together with an inner wall accommodating tilting and rotating movements, and a single stud projecting through both ring members and having a head tiltable and rotatable on the inner bearing wall of the second member.

A still further object of the invention is to provide a double socket tie rod end joint assembly accommodating universal movements between a steering arm and a pair of tie rods.

A still further object of the invention is to provide a multiple tie rod joint capable of replacing a plurality of single tie rod joints.

Other and further objects of the invention will be apparent to those skilled in the art from the following detailed descriptions of the annexed sheets of drawings which, by way of preferred example only, illustrate one embodiment of the invention.

On the drawings:

Figure 1 is a side elevational view of a double socket tie rod joint according to this invention and illustrating a rubber sealing boot thereon in vertical cross section.

Figure 2 is a bottom plan view of Figure 1.

Figure 3 is a transverse vertical cross-sectional view, with parts in elevation, taken along the line III—III of Figure 1.

Figure 4 is a fragmentary longitudinal cross-sectional view, with parts in elevation, taken along the line IV—IV of Figure 2.

Figure 5 is a transverse cross-sectional view, taken along the line V—V of Figure 1.

Figure 6 is an exploded view with parts in fragmentary vertical cross section and in elevation illustrating the elements of the joint shown in Figures 1 to 4.

Figure 7 is an end elevational view of the rubber boot for the joint assembly.

Figure 8 is a bottom plan view of the outer socket member of the joint.

Figure 9 is an end elevational view of the outer socket member taken along the line IX—IX of Figure 8.

Figure 10 is an end elevational view of the inner socket member.

Figure 11 is a top plan view of the closure plug or cap.

As shown on the drawings:

In Figures 1 to 4 inclusive the reference numeral 10 designates generally a double socket tie rod joint, and the reference numeral 11 designates a rubber boot for protecting the joint assembly against egress of lubricant and ingress of dirt.

The joint 10 has an outer socket member 12 with an integral laterally extending externally threaded shank or stem 12a. The socket 12 has an internal fragmental spherical bearing wall 12b converging from a large open bottom end 12c to a smaller top opening 12d. A recess 12e is formed in the side wall of the socket opposite the stem 12a and extends from the bottom 12c into spaced relation beneath the opening 12d. This recess 12e is rounded or arched.

An inner socket 13 has an integral laterally extending externally threaded shank or stem 13a, a fragmental spherical outer annular wall 13b, a fragmental spherical inner wall 13c, an open bottom 13d, and a smaller open top 13e.

The socket 13 is nested within the socket 12 with the outer wall 13b seated on the inner wall 12b in tiltable and rotatable relationship, and with the shank 13a projecting freely through the recess 12e.

A stud 14 has a fragmental spherical head 14a seated on the inner wall 13c of the inner socket 13 in tiltable and rotatable relation together with a cylindrical stem portion 14b projecting freely through the apertures 13e and 12d of the sockets 13 and 12. A tapered eye-receiving portion 14c is provided at the upper end of the cylindrical shank 14b, and this portion terminates in a cylindrical externally threaded end 14d receiving a nut 15 thereon to secure the eye end of a steering arm (not shown) on the tapered portion 14c of the stud. The stud has a rounded button end 14e projecting from the center of the bottom of the head 14a thereof.

A spring retainer 16 has a top wall with a rounded depression 16a therein receiving the button end 14e of the stud together with a peripheral skirt portion 16b depending therefrom. A spring 17 acts on the top wall of the retainer within the confines of the skirt 16b to urge the depressed portion 16a against the button end 14e of the stud and thereby force the stud head 14a into good seating or bearing engagement with the socket wall 13c. The socket member 13, in turn, is urged into good bearing relationship with the socket wall 12b.

A closure plug 18 has a bottom wall 18a and an upstanding peripheral wall 18b with a recess 18c in a portion thereof. This closure plug 18 has the upper end of the peripheral wall 18b thereof seated against the bottom end 12c of the socket 12 and welded to the socket by means of a bond W (Figure 1). The recess 18c is aligned with and extends the recess 12e of the socket.

The spring 17 is bottomed on the bottom wall 18a of the closure plug 18. This closure plug 18 holds the joint parts in assembled relationship, but does not interfere with universal movement of the parts.

As shown in Figure 6, the socket 12 is in the form of a ring or eye end on a stem, while the stem projects beneath the bottom of the socket. The socket 13 is similar, but it does not have the recess similar to 12e.

The joint elements are readily assembled as indicated in Figure 6 by inserting the socket 13 in the socket 12, and next inserting the stud 14 with its shank 14b through the opening in both sockets and with its head 14a on the socket wall 13c. The retainer and spring are then positioned to act on the button end of the stud 14e and the closure plug 18 is secured to the socket 12 by welding or the like. The sockets 12 and 13 can tilt and rotate relative to each other on the cooperating walls 12b and 13b thereof. The stud 14, in turn, can tilt and rotate on the socket wall 13c. The resulting assembly is thus equipped with three projecting members, viz., stems 12a, 13a, and the stud shank 14b, each of which can be universally moved through a limited extent relative to each other.

In order to protect the joint from dust, the boot or seal 11 can be provided thereon without interfering with the universal movement of the parts. This boot or seal 11 can be composed of rubber, leather, or any flexible material.

As best shown in Figures 6 and 7, the boot 11 has a top wall 11a with an upstanding central collar 11b defining an aperture 11c for snugly receiving the shank of the stud 14. A side wall or skirt 11d depends from the top wall 11a and has formed on diametrically opposite ends thereof laterally projecting U-shaped flanges 11e, 11e. These flanges have rounded top portions and open bottoms. Opposed bottom walls 11f, 11f are also provided on the bottom of the side wall 11d, but the flanges 11e have no bottom walls.

As shown in Figures 1 to 5, the collar 11b of the boot snugly fits around the tapered portion 14c of the stud shank while the top wall 11a radiates outwardly from this collar. The flanges 11e, 11e fit over the stems 12a and 13a and are wrapped around the bottom of the stem as shown in Figure 2 to overlap each other and cause the bottoms 11f, 11f to overlap, thereby forming a closed bottom for the boot. Clamps 19, 19 embrace the flanges 11e, 11e and are drawn tightly around the stems 12a and 13a by means of clamping nut and bolt assemblies 20.

The boot is readily inserted on the joint by slipping the collar 11b over the stud shank and by then positioning the clamps 19 over the flanges 11e and wrapping these flanges around the stem so as to overlap the bottom flaps 11f, 11f as shown. The flanges 11e, 11e and the collar 11b have sealing engagement with the stems 12a, 13a, and stud shank respectively while the overlapped bottom portion 11f are also held together to prevent ingress of dirt. The boot, being composed of flexible material, will not interfere with the articulate movement of the stems and stud shank even though parts of the boot are sealingly engaged on the stems and stud shank.

From the above descriptions it will be understood that the invention provides a multiple joint assembly especially adapted for automotive steering mechanisms to accommodate universal movement between a steering arm and a plurality of tie rods. The joints of this invention include nested socket members with projecting stems adapted to be secured to tie rods together with a stud member seated in one of the sockets and projecting through both of them. The sockets have universal movement relative to each other and to the stud, and the stud has universal movement relative to both of the sockets.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint assembly comprising a first socket member having an internal bearing wall accommodating tilting and rotating movements together with an aperture adjacent said internal wall, a second socket member having an external wall tiltable on said internal wall of the first member and having an aperture communicating with the aperture of the first member, said second socket member having an internal wall accommodating tilting and rotating movements, a stud having a shank projecting through the apertures of both socket members and a head tiltable and rotatable on the inner bearing wall of the second socket member, and a closure plug secured to the first socket member holding the assembly in nested relationship.

2. A tie rod joint assembly comprising a first socket member having a stem adapted to be secured to a tie rod, a second socket member nested in the first socket member having a stem adapted to be secured to a second tie rod, and a stud universally tiltable relative to both members and having a shank projecting through both members adapted to be secured to a steering arm.

3. A universal joint assembly comprising a first stemmed ring member having an internal bearing wall and a side recess, a second stemmed ring member having external and internal bearing walls with the external wall thereof tiltable on the internal wall of the first member and with the stem thereof projecting freely through the side recess of the first member, a stud having a head tiltable on the internal bearing wall of the second member and a shank projecting freely from both members, a closure plug secured to the first ring member, and a spring-urged retainer bottomed on said closure plug acting on said stud to hold the joint parts in proper bearing relation.

4. A joint assembly comprising a first socket member having an open-ended cup-shaped eye end with an internal wall accommodating tilting and rotating movements and an offset shank projecting therefrom, a closure plug having a skirt welded to one open end of the eye end, said plug skirt and eye end having aligned recesses defining a lateral opening into the first socket member, a second socket member having an open-ended cup-shaped eye end with internal and external walls accommodating tilting and rotating movements and a shank projecting therefrom, said external wall of the second socket member seated on the internal wall of the first member with the shank of the second member projecting freely through the lateral opening, a stud having a head seated on the internal wall of the second socket member and a shank projecting through open ends of both eye ends, and a spring-pressed retainer between the plug and stud head urging the parts into proper bearing relation.

5. A joint assembly comprising superimposed nested apertured socket members in universally tiltable and rotatable relation, said nested socket members forming a stack, and a stud having a head seated in one of said socket members at an end of the stack in tiltable and rotatable relation therein together with a shank projecting from said head freely through the apertures of all of the socket members in the stack.

6. A multiple joint having nested heads in universally tiltable relation, a shank on one head projecting axially from the nested heads, stems on the other heads projecting laterally from the nested heads, a closure boot for the joint having an apertured top wall snugly surrounding the shank and a depending skirt covering the heads with flanges on said skirt covering the stems, and clamps on said flanges holding the flanges wrapped around the stems in sealing relation and holding the skirt wrapped around the heads with the top wall of the boot spaced above the nested heads.

7. A multiple tie rod joint assembly comprising a plurality of stem members each having a ring-like end portion, said ring-like end portions being disposed in superimposed stacked relation, and a stud having a head engaging a ring-like end portion at one end of the stack together with a shank projecting freely through all of the ring-like portions, said stem members and said stud being universally tiltable and rotatable relative to each other.

8. In a tie rod joint having rods with nested heads in universally tiltable and rotatable relation, with the shank of one rod projecting axially from the nested heads, a closure boot comprising an enlarged collar in spaced relation above said joint and having an aperture for tightly receiving the shank of said one rod and flange portions on either side of said collar blended upwardly and inwardly into said enlarged collar, and opposed skirts depending from said collar and said flanges, one on each side of said joint for wrapping under said joint in overlapping, boot closing relation and clamp members disposed over said flange portions for holding the boot in closed position, said boot being preformed of flexible material to afford sealing engagement with the shank of the rod when said clamps are applied.

MARSHALL HOMER ALLDREDGE.

REFERENCES CITED

The following references are of record in the file of this patent:

UNITED STATES PATENTS

| Number | Name | Date |
|---|---|---|
| 946,183 | Williams | Jan. 11, 1910 |
| 1,312,280 | Sperry | Aug. 5, 1919 |
| 1,434,610 | Gunn | Nov. 7, 1922 |
| 1,531,557 | Klages | Mar. 31, 1925 |
| 2,049,502 | Hufferd et al. | Aug. 4, 1936 |
| 2,246,833 | Beemer | June 24, 1941 |

FOREIGN PATENTS

| Number | Country | Date |
|---|---|---|
| 428,918 | Great Britain | May 21, 1935 |
| 488,311 | Germany | Dec. 23, 1929 |